Patented June 20, 1939

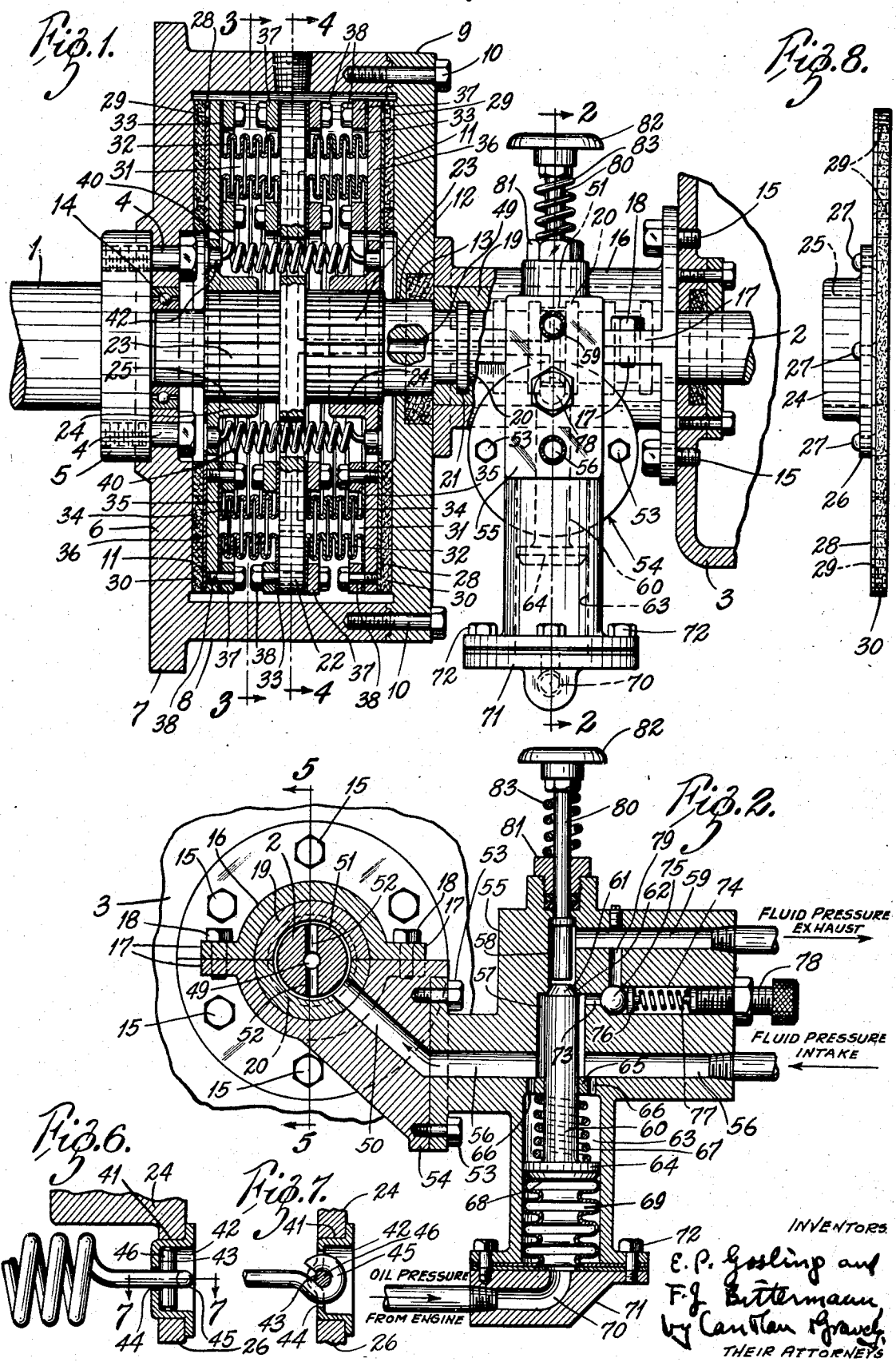

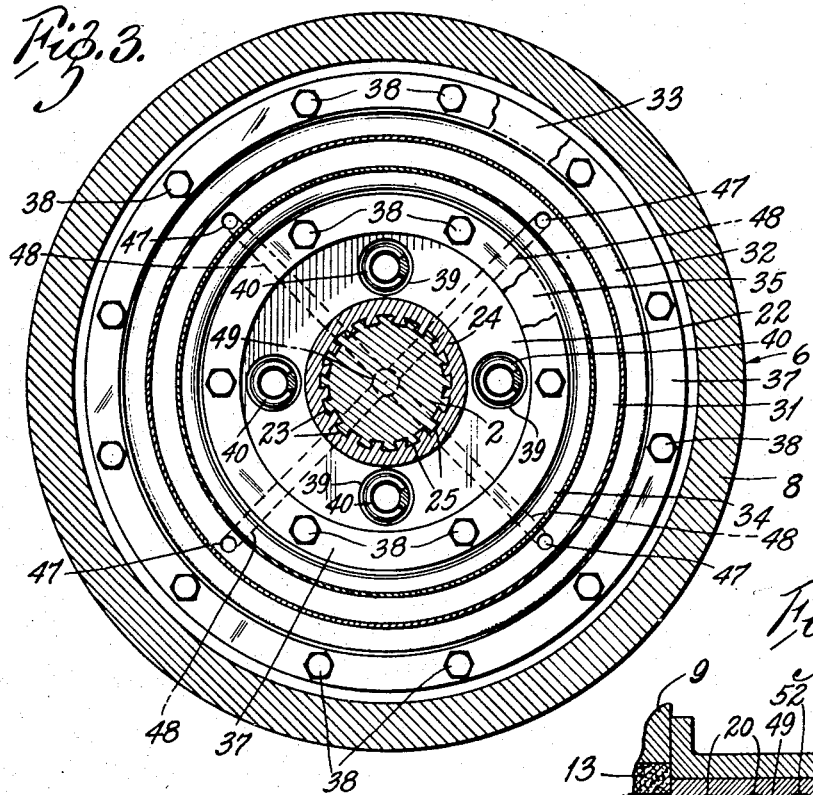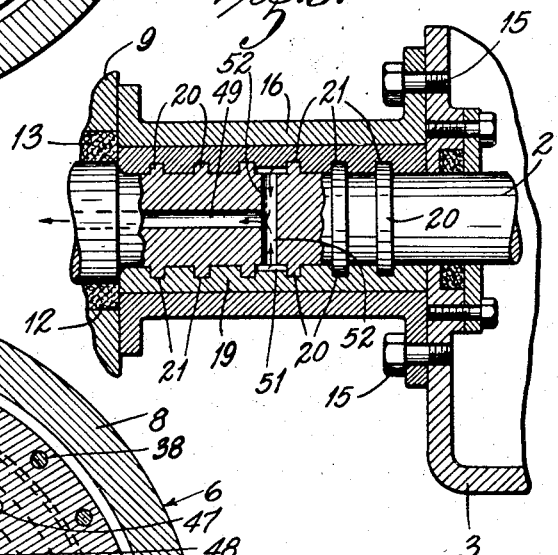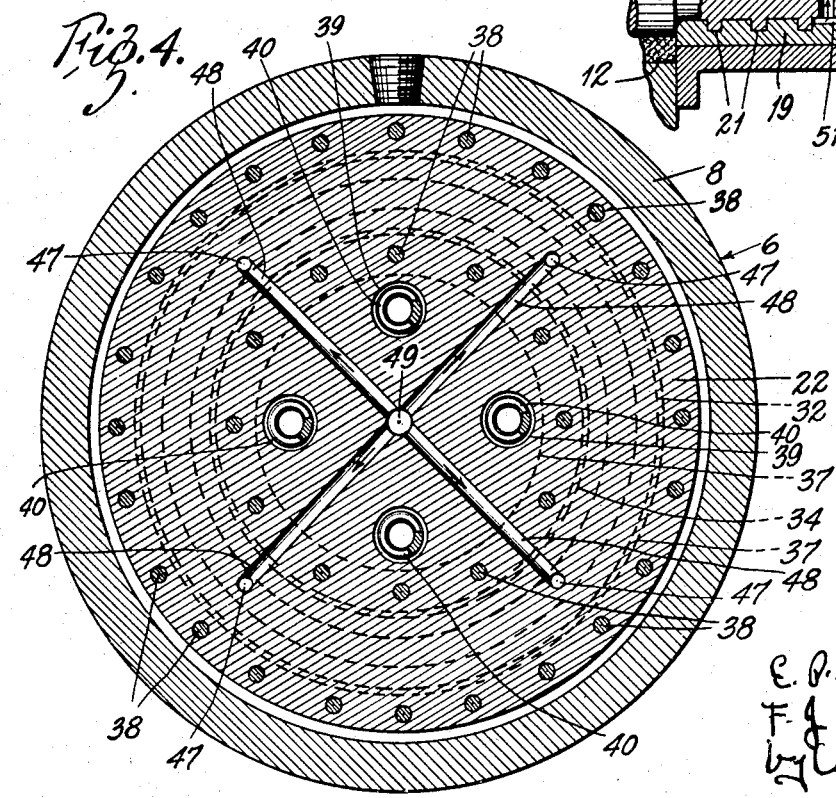

2,163,033

UNITED STATES PATENT OFFICE 2,163,033

FLUID PRESSURE CLUTCH

Edward P. Gosling and Ferdinand J. Bittermann,
St. Louis, Mo.

Application July 19, 1937, Serial No. 154,362

2 Claims. (Cl. 192—38)

Our invention relates to fluid pressure clutches and has for its principal object a clutch of the fluid pressure type which may be selectively fully automatic in its operation or manually operable, which is simple and compact in construction, which minimizes the number of parts, which equalizes the pressure over the clutch surfaces and which minimizes the risk of loss of fluid. Other objects and advantages will appear hereinafter.

In the accompanying drawings, wherein like reference characters indicate like parts wherever they occur, Fig. 1 is a part vertical sectional view, part elevation of a fluid pressure clutch embodying our invention, Fig. 2 is a vertical sectional view of the fluid pressure regulating portion of the clutch on the line 2—2 in Fig. 1, Fig. 3 is a sectional view on the line 3—3 in Fig. 1, Fig. 4 is a sectional view on the line 4—4 in Fig. 1, Fig. 5 is a sectional view on the line 5—5 in Fig. 2, Fig. 6 is a detail sectional view showing the mounting of a retraction spring, Fig. 7 is a sectional view on the line 7—7 in Fig. 6; and Fig. 8 is a side elevation showing the construction of one of the slidable hub members of the clutch and the clutch plates secured thereto.

In the drawings is illustrated a clutch embodying our invention, an automobile clutch being indicated, the drawings showing the usual engine crank shaft 1 (the engine not being shown) and transmission shaft 2 alined therewith and projecting into a transmission case 3 (only a portion of said transmission case and none of the transmission mechanism being illustrated in the drawings). Secured, as by cap screws 4, to the end 5 of the crank shaft 1, which is shown as being flanged or upset for the purpose, is a fly wheel 6 on whose periphery may be formed the starter ring gear 7. Said fly wheel has a projecting cylindrical portion 8, to the outer end of which is secured a cover 9, as by cap screws 10. The fly wheel with its cylindrical extension and said cover constitute the housing for the clutch. The radially disposed inner faces 11 of the fly wheel and of the cover serve as clutch faces.

The clutch housing cover has a central opening 12 through which the transmission shaft 2 extends, a suitable oil-tight packing ring 13 for the transmission shaft being mounted in said opening. The end of the transmission shaft 2 is mounted in a pilot bearing 14 provided at the center of the fly wheel 6. Extending from the transmission case to the clutch housing and secured to the transmission case by screws 15, is a pressure bearing 16 constituting a hollow support for the transmission shaft. Said bearing 16 is composed of sections having longitudinal flanges 17 secured together by screws 18. The bearing has a liner 19 of suitable bearing material. Said shaft 2 is provided with a plurality of circumferential ribs 20 and said bearing liner 19 has internal annular grooves 21 receiving the ribs 20 of said shaft.

Centrally of the housing, said transmission shaft 2 is provided with an integral radially disposed plate 22, hereinafter designated as the thrust plate. As is described hereinafter, the fluid under pressure is distributed through passageways in the thrust plate.

On either side of the thrust plate 22, the transmission shaft 2 has splines 23 and hub members 24 are slidably mounted thereon by internal splines 25. Each hub member 24 has a radial flange 26 at the end to which is secured, as by rivets 27, an annular disk or plate 28, hereinafter designated as a clutch plate. To each clutch plate is secured, as by rivets 29, an annular clutch facing 30 of any suitable friction material. Secured to each face of the thrust plate 22 is an annular bellows or expanding diaphragm member indicated generally by 31 comprising an outer annular corrugated wall member 32 having end flanges 33 extending radially outwardly and an inner annular corrugated wall member 34 having end flanges 35 extending radially inwardly. Interposed between the bellows members 31 and the respective clutch plates 28 are annular plates 36, hereinafter designated as pressure plates. The bellows flanges 33, 35 at one end of each bellows 31 are disposed flatwise against the thrust plate 22 and are held in position by means of sealing rings 37 extending therearound and screws 38 extending through said sealing rings into the thrust plate 22. The other end flanges 33, 35 of the bellows engage the respective pressure plates 36 and are secured thereto by similar sealing rings 37 and screws 38.

Openings 39 are provided in said thrust plate 22 radially inwardly of the bellows members 31 and through said holes 39 extend springs 40 whose ends are secured to the hub members 24. As shown in Figs. 6 and 7, the hub members 24 have holes 41 in which are seated cups 42 having grooves 43 in their bottoms and slots 44 extending transversely of said grooves 43. The loop 45 at the ends of said springs 40 extend through said slots 44 and are held by pins 46 extending through said loops 45 and seated in said grooves 43. The action of said springs 40 is to pull the hub members 24 toward each other, retracting the clutch plates 28 and their facings 30 from the clutch faces 11 of the fly wheel 6 and cover 9, thereby disengaging the clutch. If sufficient fluid pressure is supplied to said bellows members 31 to overcome said springs 40, the pressure plates 36 acting against the clutch plates 28 force their facings 30 into engagement with the fly wheel 6 and cover 9, respectively, the hub members 24 sliding along the transmission shaft 2 to permit the clutch engagement.

A suitable fluid pressure system is shown in the drawings, the pump or other source of the fluid pressure not being illustrated. Such pressure source may be of any desired construction and suitably located on the vehicle. The pressure fluid is likewise of whatever nature is suitable for the particular installation. The thrust plate 22 is provided with transverse passageways 47 communicating with the interiors of the bellows members 31 and with radial passageways 48 which open into an axial passageway 49 in the transmission shaft 2. A passageway 50 extending through the transmission shaft bearing 16 and liner 19 supplies fluid to an annular groove 51 formed in said bearing liner 19 between two of said ribs 20 on the transmission shaft 2 and communicating with radial passageways 52 in said transmission shaft which open into said axial passageway 49. Fluid under pressure may be supplied to the system of passageways leading to the bellows 31 by any suitable means, the means illustrated providing for a selective manual or fully automatic operation of the clutch.

Secured, as by cap screws 53, to an abutment 54 projecting from the transmission shaft support 16 is a fluid pressure control housing 55. A passageway 56 extending longitudinally through said housing communicates with the passageway 50 leading to the transmission shaft 2 and may be supplied with fluid under pressure by any suitable means, not shown in the drawings. Extending transversely through said housing 55 and opening through fluid pressure passageway 50 is an enlarged bore 57 which communicates with an alined smaller bore 58 which, in turn, communicates with a fluid pressure exhaust passageway 59. A valve rod 60 extending through said enlarged bore 57 has a valve 61 cooperating with a valve seat 62 at the end of said exhaust bore 58 to permit opening and closing said exhaust passageway. Said valve rod 61 is smaller than said transverse bore 57 and extends into a still larger aligning bore or chamber 63. Said valve rod 60 has an enlarged head 64 at the end remote from said valve 61 and in said chamber 63. The end portion of said bore 57 opening into said chamber 63 is of reduced size, forming a ring 65 that guides said valve rod 60. The enlarged head 64 of said rod 60 is guided in said chamber 63. Openings 66 allow the fluid under pressure to enter said chamber 63. Mounted on the valve rod between said head 64 and the housing is a spring 67 which urges the valve rod 60 in a direction to unseat the valve 61, thereby opening the exhaust passageway 58. Said enlarged head 64 is seated against the closed end 68 of a bellows member 69 whose outer end is open and communicates with a passageway 70 that connects with the engine oil line. Said passageway is formed in a cap 71 that covers the end of the chamber 63 in which the bellows is mounted and is secured in place by means of screws 72.

Leading from the cross bore 57 surrounding the valve rod 60 is a pressure relief passageway 73 which opens into an enlarged passageway 74 in which is mounted a ball check valve 75 that is normally held in seated position by means of a disk 76 that closes said passageway 74 and is held against the valve ball 75 by means of a spring 77. An adjusting screw 78 is provided for adjusting the spring 77 and hence changing the pressure at which the ball valve 75 will be actuated. Communicating with said passageway 74 is another passageway 79 that opens into the exhaust passageway 59. Thus when the pressure in said bore 57 reaches a predetermined point, the ball valve 75 will be moved away from its seat and part of the fluid will be by-passed into the exhaust passageway 59, thus relieving the pressure in the system.

Mounted in the transverse exhaust bore 58 is a push rod 80 that is held in position by means of a packing nut 81 and which has an actuating button 82 on its projecting end, a spring 83 encircling the push rod and urging the button 82 in a direction to hold the push rod 80 clear of the valve rod 60. The push rod 80 may be actuated to unseat the valve 61 and permit the clutch fluid to exhaust, thereby releasing the clutch, regardless of the pressure in the bellows or diaphragm that is responsive to the engine oil pressure. The actuating button may be so located as to be operated directly, or it may be operated through suitable connections with the usual clutch pedal.

As appears from the foregoing description, the clutch is normally automatic in operation, but may be operated manually. Assuming that the engine is running, oil under pressure will actuate the bellows 69 and thus move the valve rod 60 to cause the valve 61 to seat and close the exhaust passageway 58. Thus the clutch actuating fluid will be admitted to the system of passageways leading to the clutch actuating bellows 31 and the clutch will be engaged, remaining engaged until such time as the engine oil pressure drops, permitting unseating of the valve 61 and relief of the fluid pressure. If excess pressure builds up in the clutch system, such excess pressure will be relieved through the ball check valve 75, but the clutch will remain in engagement. If at any time it is desired to release the clutch, regardless of the speed at which the engine is operating, this may be accomplished by means of the clutch release push rod 80.

The above described clutch construction has many advantages. It is fully automatic in operation, if desired, but may be manually operated at any time. Adjustment is likewise automatic and full and equal engagement and pressure are maintained between the engaging portions. The usual levers, toggles and pivot pins are eliminated, the number of parts is reduced to a minimum and the fluid is kept fully enclosed and danger of leakage minimized. The clutch may be utilized to increase its pressure and thus obtain an increase in torque. The thrust collar and thrust bearing normally required are dispensed with. When used in an automobile, coasting or free wheeling is obtained, the clutch opening or disengaging automatically when the engine is decelerated and engaging automatically when the engine is accelerated.

The clutch is fully enclosed, eliminating dust and other foreign matter.

The clutch is positively and quickly released, thereby eliminating clutch drag. Clutch chatter is eliminated and smooth operation of the clutch at low speed is assured by the reduced clutch pressure at low speed. Other important advantages are inherent in the structure. The clutch has been described as embodied in an automobile, but obviously it is adapted for general use.

Obviously numerous changes may be made without departing from the invention and I do not wish to be limited to the precise construction shown.

What we claim is:

1. A fluid pressure clutch comprising a housing secured to the end of a rotating shaft, said housing having internal radially disposed clutch faces, a transmission shaft extending into said housing in alinement with said first named shaft, said transmission shaft having a radially disposed thrust plate fixed thereon and having splines on both sides of said thrust plate, internally splined hubs mounted on the splined portions of said transmission shaft, radially disposed annular clutch plates fixed on said hubs, annular pressure plates adjacent to the faces of said clutch plates remote from said clutch faces of said housing, annular bellows members, each secured to a face of said thrust plate and to one of said pressure plates, and springs secured to said hub members and extending through holes provided therefor in said thrust plate for urging said hubs towards each other and collapsing said bellows, said transmission shaft and thrust plate having passageways permitting flow of fluid into said bellows to expand them and engage the clutch.

2. A fluid pressure clutch comprising a rotating engine shaft having an upset end, a fly wheel secured to said upset end of said shaft, said fly wheel having a cylindrical extension, a cover for the end of said extension opposite said fly wheel, said fly wheel, extension and cover constituting a housing having internal radially disposed clutch faces, a transmission shaft extending into said housing in alinement with said engine shaft, a pilot bearing for said transmission shaft in said fly wheel, said transmission shaft having a radially disposed thrust plate fixed thereon and having splines on both sides of said thrust plate, internally splined hubs mounted on the splined portions of said transmission shaft, radially disposed annular clutch plates fixed on said hubs, annular pressure plates adjacent to the faces of said clutch plates remote from said clutch faces of said housing, annular bellows members, each secured to a face of said thrust plate and to one of said pressure plates, and springs secured to said hub members and extending through holes provided therefor in said thrust plate for urging said hubs towards each other and collapsing said bellows, said transmission shaft and thrust plate having passageways permitting flow of fluid into said bellows to expand them and engage the clutch.

EDWARD P. GOSLING.
FERDINAND J. BITTERMANN.